June 5, 1956  H. C. HILL  2,748,623
ORBIT GEAR CONTROLLED REVERSIBLE PLANETARY TRANSMISSIONS
Filed Feb. 5, 1952  4 Sheets-Sheet 1

INVENTOR.
HENRY C. HILL
BY
Reynolds, Beach & Christensen
ATTORNEYS

June 5, 1956 H. C. HILL 2,748,623
ORBIT GEAR CONTROLLED REVERSIBLE PLANETARY TRANSMISSIONS
Filed Feb. 5, 1952 4 Sheets-Sheet 2

INVENTOR.
HENRY C. HILL
BY
Reynolds, Beach & Christensen
ATTORNEYS

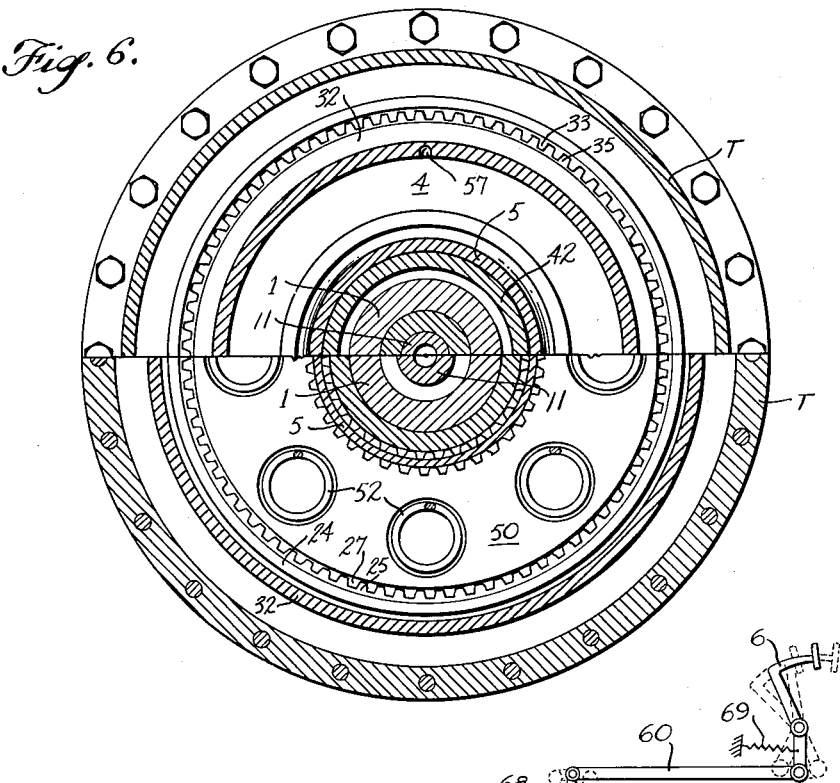
Fig. 6.
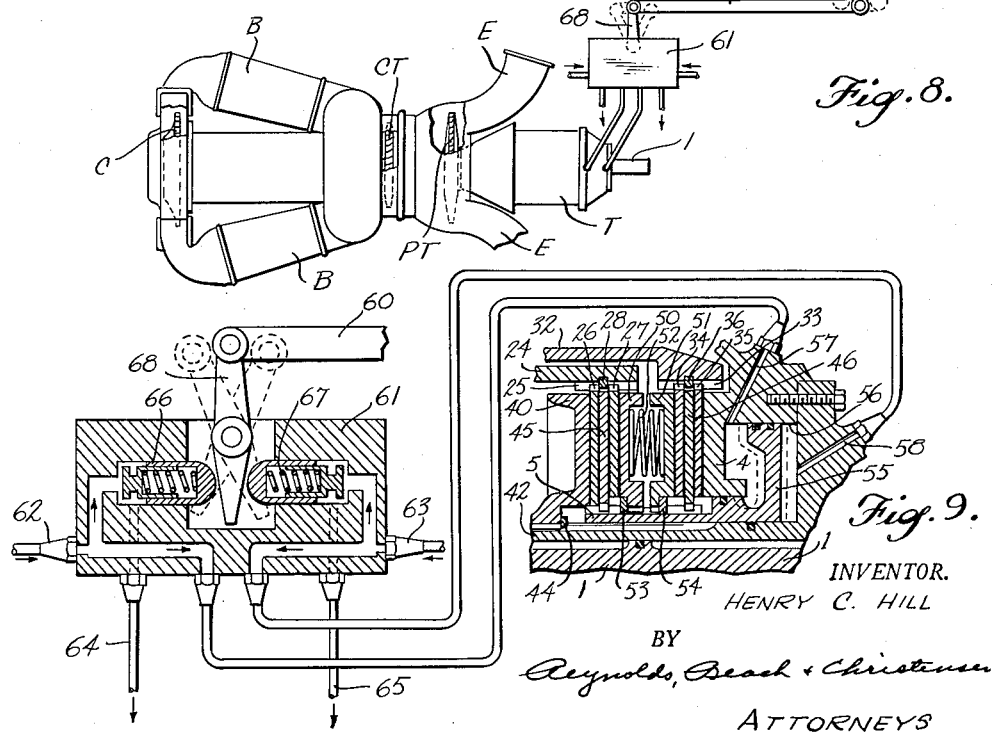
Fig. 8.
Fig. 9.
INVENTOR.
HENRY C. HILL
BY
Reynolds, Beach & Christensen
ATTORNEYS

INVENTOR.
HENRY C. HILL

United States Patent Office 2,748,623
Patented June 5, 1956

2,748,623

ORBIT GEAR CONTROLLED REVERSIBLE PLANETARY TRANSMISSIONS

Henry C. Hill, Seattle, Wash., assignor to Boeing Airplane Company, Seattle, Wash., a corporation of Delaware Application February 5, 1952, Serial No. 270,008

11 Claims. (Cl. 74—768)

This invention relates to a forward and reverse transmission mechanism for interposition between a power source and an output shaft. While the power source may be of various types, the present transmission is particularly suitable for coupling a load to a gas turbine type of power source in which the power turbine is separate from the turbine utilized to drive the compressor. In this type of gas turbine the power turbine can be rotated at speeds different from the speed of the compressor and compressor driving turbine, and, in fact, the power turbine can even be rotated in the direction opposite that in which the compressor and compressor driving turbine turn.

A particular object in devising the present development was to provide a transmission which included gearing always in mesh between the power source and the output shaft, irrespective of the direction of relative rotation of the two. Also, when the power source and output shaft are rotating oppositely, the power source, such as a turbine, could be rotating in the same direction or in the direction opposite the direction of rotation of the compressor and compressor driving turbine of a gas turbine power unit. In one instance, therefore, the turbine might be supplying power to drive a vehicle in the reverse direction, and in another instance the output shaft might be rotating in the forward direction, and a dynamic braking force would be produced on the power source turbine rotating opposite to its normal rotation.

Another object of the transmission is to provide a transmission which under all load conditions can be shifted smoothly from rotation of the power source and output shaft in the same sense through a neutral position in which one or the other is not rotating, and into reversing position in which the direction of rotation of one or the other is reversed, and the power source and output shaft are rotating relative to each other in opposite directions.

In accomplishing the objects mentioned above, it is a further object to provide such transmission mechanism which will have approximately the same drive ratio between the power source and output shaft when they are rotating in the same senses as when they are rotating in opposite senses.

These objects are accomplished by mechanism of the present invention which is compact, but has the ability to transmit heavy loads. Moreover, the mechanism is simple to control, and the parts are not subjected to appreciable wear conditions.

In essence the transmission includes two epicyclic gear trains interconnecting the power source and the output shaft, one being of the forward type interconnecting the power source and output shaft for rotation in the same direction, and the other epicyclic gear train being of the reversing type and interconnecting the power source and output shaft for rotation in opposite directions. The internally toothed or ring gears of these two epicyclic gear trains are alternatively held stationary, so that the only one of the epicyclic gear trains can be effective at any given time to control the drive between the power source and the output shaft. Both internal gears can be able to rotate, however, so that motion will not be transmitted between the power source and the output shaft. Preferably a friction plate type brake is utilized to hold stationary each of the internal gears of the epicyclic gear trains, and these brakes are arranged for selective alternate engagement to effect a drive connection between the power source and the output shaft in the desired relationship.

More specific details and features of the preferred form of transmission mechanism, as shown in the drawings, are pointed out in the following description.

Figure 6 is a transverse section through the transmission, taken on line 6—6 of Figure 1.

Figure 8 is a diagrammatic plan view of the turbine and transmission, to which is connected transmission control mechanism shown in side elevation, and Figure 9 is a diagrammatic view showing in section a portion of the transmission control mechanism connected to a portion of the transmission mechanism.

Figure 1:
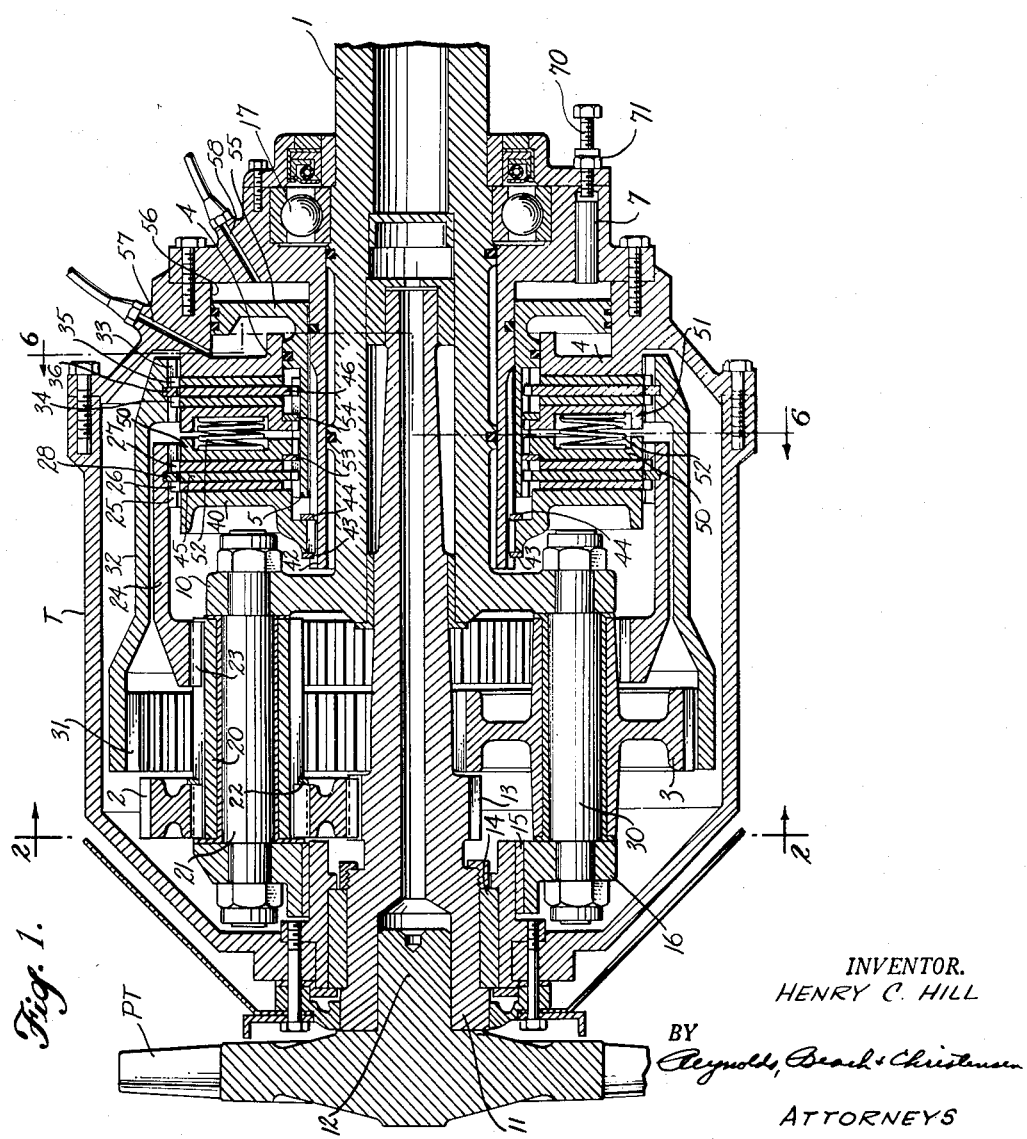
Figure 1 is a longitudinal section through the transmission mechanism, showing the parts in neutral position.

Where a gas turbine of the type having a power turbine rotor separate from the compressor and compressor driving turbine rotor is used to drive an automobile vehicle the rotative speed of the power turbine rotor need not bear any set relation to the compressor shaft speed. The speed of the power turbine rotor is a function of the energy fed into it by the exhaust gases discharged through the compressor driving turbine, the direction of the reactive torque applied to the rotor, and its magnitude. The compressor and compressor driving turbine must always rotate in the same direction to obtain efficient combustion, but since the power turbine rotor is on an independent shaft it can be rotated at a speed differing from that of the compressor shaft without affecting combustion efficiency.

By the use of the present transmission it is possible to carry this difference in rotation between the compressor driving turbine rotor and the power turbine rotor much farther, that is, to the point where the power turbine rotor is actually turning in the direction opposite that in which it tends to be driven by the gas supplied to it. Such direction of power turbine rotor rotation can be obtained, of course, only by exerting a high torque on the power turbine rotor in a direction counter to the direction of rotation in which it tends to be driven by gas supplied to it. Stated differently, the combustion gas passing through first the compressor driving turbine rotor and then through the power turbine rotor will exert a force opposing such counterrotation of the power rotor, and the amount of such force will correspond to the speed of rotation of the compressor and compressor driving turbine.

It may at first be thought that there would never be any point in turning the power turbine rotor in opposition to the direction in which it tends to be driven by the gas supplied to it. When such a gas turbine is used in an automotive vehicle, however, this capability of the separate turbines to operate independently can be used to provide dynamic braking, such as for a truck descending a long grade. The output shaft in that instance would actually be turning in the direction for forward drive of the truck, and the turbine compressor and its driving rotor would likewise be turning in the direction to supply power to the power turbine rotor as during conventional operation of the truck, but the power rotor would be turning in the direction opposite the direction in which it would turn during conventional operation. The same relationship between the rotation of the power turbine and the output shaft would, of course, exist when the turbine is being used to supply power for driving the automotive vehicle in the reverse direction. The following description of the specific construction of the transmission shown in the drawings should be considered with the capability of the turbine and transmission combination to provide dynamic braking in mind.

Because gas turbines of the type utilizing a power turbine rotor PT rotatively independent of the compressor and compressor driving turbine are known and are not part of the present invention, the internal structure of such a complete turbine is not illustrated in the drawings, but the power rotor PT will be referred to generally as a representative power source. It will be understood, however, that the transmission of the present invention could equally well be used to connect other types of power source to the output shaft 1. Also, while the transmission is particularly well adapted for use in automotive vehicles, it could be employed for stationary power installations, for marine use, and even for aircraft use in some situations. The turbine T may include generally a compressor section C which compresses air supplied to the burners B. From these burners hot gas is delivered to the compressor driving turbine wheel CT which drives the compressor, and from this turbine the gas flows through the power turbine wheel PT and then out through the exhaust stacks E. The transmission mechanism T is conveniently located between the divergent exhaust stacks, as shown in Figure 8.

The output shaft 1 carries a satellite gear mounting plate or spider 10 located in a transverse plane approximately midway between the ends of the transmission casing. The power input shaft 11 is disposed coaxially with the power output shaft, and, as shown best in Figure 1, such output shaft preferably is hollow and receives within it the aft end of the input shaft with suitable bearings interposed betweeen the exterior of the input shaft and the interior or bore of the output shaft. The power turbine rotor PT is carried by the forward end of the input shaft 11, and a convenient method of securing these two components together is to provide a stem 12 on one side of the power turbine rotor to fit into a recess in the end of the input shaft 11. By chilling the rotor stem 12 it may be contracted, and by heating the end of the input shaft 11 its recess or cavity may be enlarged. If the dimensions of the stem and shaft recess are such that under these conditions the parts must be pressed together, a secure connection will be accomplished without the use of positive interconnecting means. During operation of the turbine the rotor PT will be heated, causing the stem 12 to tend to expand. This tendency further binds the stem in the cavity of shaft 11.

Approximately midway between the power rotor PT and the satellite gear supporting plate or spider 10 of the output shaft 1, the input shaft 11 carries a sun gear 13. Between this sun gear and the rotor PT the shaft 11 is journaled in a bearing 14 serving both as a radial bearing and as a thrust bearing. Encircling this bearing is a further bearing 15 journaling an annulus 16, which cooperates with the spider or plate 10 to carry the satellite gears.

The transmission incorporates two sets of satellite gears mounted between the annulus 16 and the plate or spider 10. While each set of such gears may include any number capable of being accommodated conveniently, each set preferably includes three, equally-spaced gears. Thus the first set includes gears 2 arranged about the input shaft 11 at angular spacings of 120 degrees. These gears mesh continually with sun gear 13 and each conveniently may have an internal apertured splined to fit the pinions 20 which is journaled on a shaft 21 having opposite ends secured respectively in the annulus 16 and in the plate or spider 10 carried by output shaft 1. The diameters of such annulus and plate should be sufficient not only to afford adequate support for the shaft ends, but to overlap the ends of the pinions 20 sufficiently to hold them against axial movement. In fact, it is desirable for the diameter of annulus 16 to be sufficient to overlap the internal apertures of gears 2 to hold these members against axial movement beyond the end of the pinions 20. The gear may be held against movement along the pinion rod in the opposite direction in each instance by a split spring ring 22 received in notches in the teeth of the pinion rod.

The other set of satellite gears may also include three gears 3 which are likewise spaced apart 120 degrees, each being arranged midway between two adjacent gears 2. These gears are journaled on shafts 30, extending between and supported by the annulus 16 and the plate or spider 10 at their opposite ends. The relative arrangements of the two satellite gear structures may be seen in Figures 2 and 4. It will be noted in these figures that the shafts 21 and 30 are located at the same radial distances from the center of input shaft 11, and each gear 3 meshes with two pinions 20.

The gears 3 mesh with an internally toothed gear 31 carried by a sleeve or tube 32 which extends from such gear to an element 33, which may be in the form of an internally splined member forming a component of brake mechanism. Also the ends of pinions 20 opposite gears 2 mesh with an internal gear 23 carried by a sleeve 24, the opposite end of which is likewise formed as an internally splined member 25 constituting a component of a second brake mechanism.

Output shaft 1 is supported by a suitable bearing 17 at a location spaced axially a considerable distance from the plate or spider 10. In this space is mounted double-acting friction brake mechanism, shown in Figures 1, 3, 5, 7 and 9. This brake mechanism is mounted between two fixed friction plates 4 and 40, which either are formed integral with a part of the transmission housing or are secured to it. Conveniently, plate 4 may be formed as an integral part of a casing portion, and such casing is provided further with an internal sleeve 42 encircling output shaft 1 and extending between the bearing 17 and the output shaft plate 10. The inwardly projecting end of this sleeve may be splined to fit splines in a central aperture of plate 40, so that such plate will be held against rotation. Axial movement of this plate 40 along sleeve 42 will be prevented by split rings 43 and 44, received in grooves or notches in the splined end of the sleeve. This sleeve and the output shaft 1 may be spaced apart slightly radially to afford lubrication space and suitable oil seals are shown interposed between them.

Except for the action of the friction brake mechanism, sleeves 32 and 24 are free to move axially, but such mechanism will restrict movement of these sleeves to a small axial movement. Sleeve 32 is rotatively connected to friction plates or rings 34 and 35, the external peripheries of which are serrated to mesh with the internally splined member 33. These plates are received at opposite sides of a split ring 36, fitting in an annular groove of member 33, located approximately midway between its axial ends. Similarly, sleeve 24 is connected for conjoint rotation with friction rings or plates 26 and 27, the external peripheries of which are serrated to mesh with internally splined member 25. These plates are located at opposite sides of the split ring 28 which fits in the annular groove approximately midway between the ends of member 25.

The sleeves 24 and 32 will be installed so that friction ring or plate 26, which rotates with sleeve 24, will lie alongside plate 40, and friction ring or plate 35 which rotates with sleeve 32 will lie alongside the opposite plate 4. Between plates 26 and 27 and in registry with ring 28 is a floating friction plate 45 having serrations in a central aperture which mesh with splines on a sleeve 5 which encircles the stationary sleeve 42. Similarly, a floating friction plate 46 is interposed between plates 34 and 35 and disposed in registry with ring 36. An internal aperture of this plate likewise is serrated to fit the splines on sleeve 5.

Between plates 27 and 34 are received brake actuating friction members 50 and 51 in the shape of rings of generally channel shaped cross section, or having registering recesses at a plurality of corresponding locations around them, which open toward each other. In the apertures or between the flanges of the friction members 50 and 51 are received springs 52 which normally urge axially apart the brake engagement control members 50 and 51. These members are held against relative rotation by serrations around centrally disposed apertures in them which, like the serrations of plates 45 and 46, engage the splines on sleeve 5. In this way plates 45 and 46 and members 50 and 51 are interconnected for conjoint action. Separating movement of members 50 and 51 under the force of springs 52 is limited by split rings 53 and 54, which are received in notches in the splines or in grooves of the sleeve member 5.

The end of sleeve 5 opposite that engaged by plate 45 carries a piston 55 fitted in a cylinder 56, which is formed in the transmission housing. With opposite ends of this cylinder passages 57 and 58, respectively, communicate, through which actuating fluid may be admitted and discharged for shifting the piston 55 in one direction or the other axially of output shaft 1.

The transmission is controlled from forward drive in which the output shaft 1 is rotated in the same direction as the input shaft 11 to reverse drive in which the output shaft rotates in the direction opposite that of shaft 11 and vice versa by actuation of the friction braking mechanism, effected by shifting piston 55 axially of its cylinder 56. When the piston is shifted to the left, as seen in Figures 1 and 9, into the position shown in Figure 3, the transmission will drive the output shaft forwardly, that is in the same direction as shaft 11, whereas if piston 55 is shifted to the right as seen in Figures 1 and 9 into the position of Figure 5, the output shaft will be driven or will move in reverse, that is in the direction opposite the rotative direction of shaft 11. Control mechanism suitable for thus shifting the piston is shown, rather diagrammatically, in Figures 8 and 9. Generally such control mechanism includes the manual operating lever 6, which may be a foot pedal, connected by linkage such as 60 to hydraulic control valve mechanism 61. This control valve mechanism will regulate the flow from a source of liquid under pressure to the cylinder 56, and the discharge of liquid from such cylinder to drain lines.

To the valve mechanism 61 are connected two supply lines 62 annd 63, through which liquid under pressure may be supplied from any convenient source, such as a lubricating pump, and lines 64 and 65 run from the valving mechanism back to the oil supply system. Within the mechanism are two valves 66 and 67, respectively. Valve 66 controls communication between supply conduit 62 and return conduit 64, while valve 67 controls the communication between supply conduit 63 and return conduit 65. When valve 66 is closed, blocking return conduit 64, the liquid under pressure supplied by pipe 62 is transmitted through passage 57 to the end of cylinder 56 at the left side of piston 55, whereas when valve 67 is closed, liquid under pressure supplied by conduit 63 flows through passage 58 to the cylinder 56 at the right side of piston 55. Valves 66 and 67 can be moved into closed position only alternatively. One or the other can be engaged by a lever 68, to which the linkage 60 is connected.

Preferably a spring 69 normally urges the control lever 6 in a direction to move its upper end to the right, as seen in Figure 8. Such movement will shift link 60 to the left and swing lever 68 to engage valve 67 for closing it. Liquid under pressure will then be supplied from connection 63 through passage 58 to the cylinder 56 for forcing piston 55 to the left into forward driving position. When the lever 6 is moved to a central position, both valves 66 and 67 will be opened, so that no appreciable pressure will be present in cylinder 56, and piston 55 automatically will be centered by the pressure on rings 53 and 54 of plates 50 and 51, respectively, as they are separated by the expansion of spring 52. If the upper end of lever 6 is moved toward the left into the opposite extreme dotted-line position shown in Figure 8, link 60 will be moved to the right, so that lever 68 will be swung to close valve 66. With the parts in this position liquid under pressure will be supplied to passage 57 from supply conduit 62, and will produce a pressure in the left end of cylinder 56 which will move piston 55 to the right into reverse drive position. Both ends of the cylinder will always be full of liquid because the oil ducts 57 and 58 extend upward from them for quick application of pressure to piston 55 by valve manipulation, although such oil will only be under pressure when one or the other of valves 66 and 67 is closed.

Figure 3:
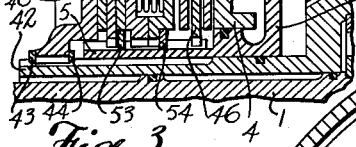
Figure 3 is a fragmentary longitudinal section corresponding to Figure 1, showing the parts in forward driving position.

To understand how shifting of piston 55 axially in cylinder 56 will cause the transmission to alter the relative directions of rotation of output shaft 1 and input shaft 11, the relative movement of the various parts of the transmission must be considered. When liquid under pressure is supplied through the passage 58 in Figure 9 to the right end of cylinder 56, forcing piston 55 to the left, ring 54 will press against control member 51 and shift it to the left, as shown in Figure 3. Such movement of control member 51 will increase the pressure on springs 52, which pressure will be transmitted to control member 50 and in turn to the plates 27, 45 and 26, until member 51 actually abuts member 50 and plates 27, 45 and 26 are pressed into a compact package between plate 50 and plate 40. These plates will be held in such relationship by continued application of hydraulic pressure to piston 55, so that the friction plates 26 and 27 will be held against rotation by plate 40, which is anchored to stationary sleeve 42. Thus sleeve 24, and consequently ring gear 23, will be prevented from rotating.

On the other hand, as brake control member 51 is shifted to the left, as seen in Figure 3, in the manner described, plates 34, 46 and 35 will be allowed to shift axially sufficiently that no appreciable friction between them will occur. Despite the fact that plate 46 is held from rotating by its engagement with sleeve 5, locked to plate 40 through plate 45, therefore, plates 34 and 35 can rotate quite freely, so that there will be no appreciable restraint on the rotation of sleeve 32 and of ring gear 31.

Figure 2:
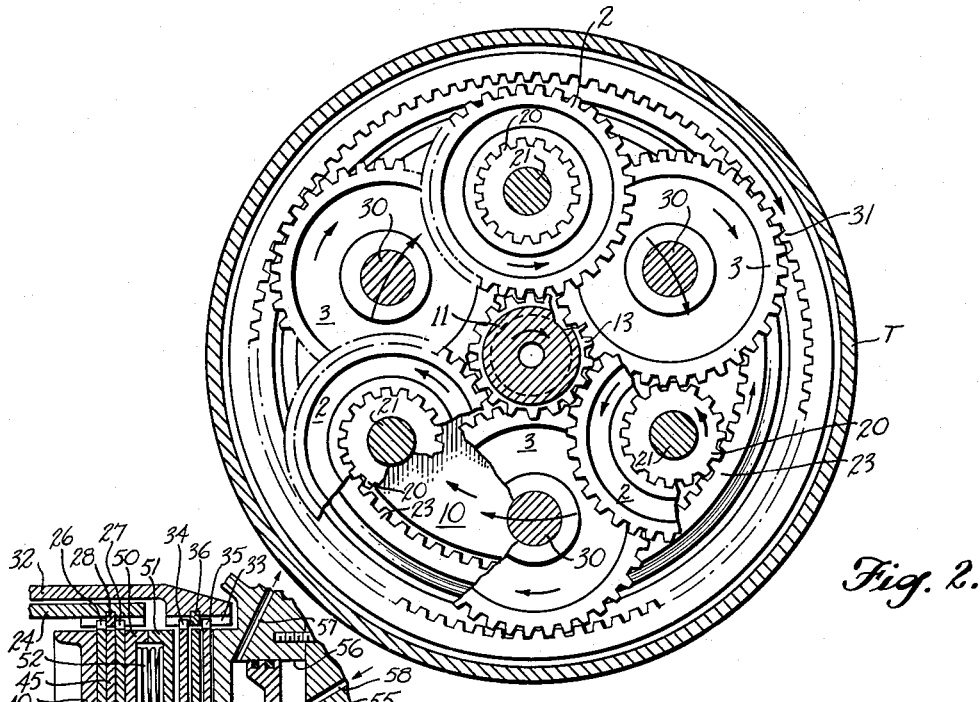
Figure 2 is a transverse section through the transmission mechanism taken on line 2—2 of Figure 1.

If with the parts in this relationship the power turbine rotor PT is turned to rotate input shaft 11 in a clockwise direction as shown in Figure 2, it will rotate correspondingly the sun gear 13 meshing with satellite gears 2. Since the pinions 20, on which gears 2 are mounted at one end, have their opposite ends in mesh with ring gear 23, held stationary in the manner described above, clockwise rotation of sun gear 13 will effect counterclockwise rotation of gears 2 and pinions 20 about their individual shafts, as indicated by the arrows in Figure 2. Such counterclockwise rotation of the pinions will roll them around stationary ring gear 23 so that the shafts 21 will move orbitally in a clockwise direction, as indicated by the arrows in Figure 2. Since these shafts are carried by annulus 16 and plate or spider 10, such plate in turn will be rotated in a clockwise direction. Since this plate is integral with output shaft 1, it also will be turned clockwise, but at a speed considerably less than the speed of rotation of input shaft 11, because of the double gear reduction afforded from gear 13 to gears 2 and from the pinions 20 integral with gears 2, to the ring gear 23. The total reduction may, for example, be nine and one-half to one. By such control of the transmission, therefore, the turbine rotor PT and the output shaft 1 will turn in forward relationship.

If it is desired to connect the input shaft 11 and the output shaft 1 in reverse relationship for relative rotation in opposite directions, lever 6, shown in Figure 8, may be swung so that its upper end is fully to the left, which action will swing lever 68 to close valve 66 and permit the pressure in conduit 63 to open valve 67. Liquid entering the valve mechanism under pressure through pipe 62 will then be transmitted to passage 57, through which it will enter the left end of cylinder 56 and force piston 55 to the right, because the right end of this cylinder will be vented through the valve mechanism by way of passage 58 to the relief line 65. Such venting will not empty the right end of the cylinder, however, because supply line 63 will still be supplying oil, but it will merely relieve the pressure so that when the valve 67 again is closed, the pressure can build up almost immediately in the right end of the cylinder with little actual transfer of liquid, even though the valve control mechanism 61 may be located at a considerable distance from the cylinder 56.

Figure 5:
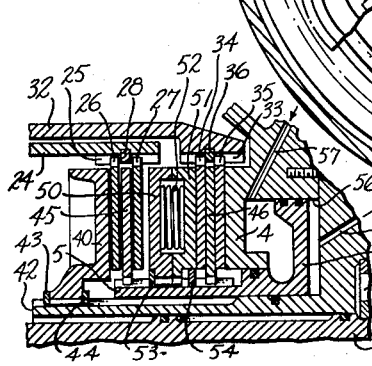
Figure 5 is a fragmentary longitudinal section corresponding to Figure 3, showing the parts in reverse driving relationship.
Figure 7:
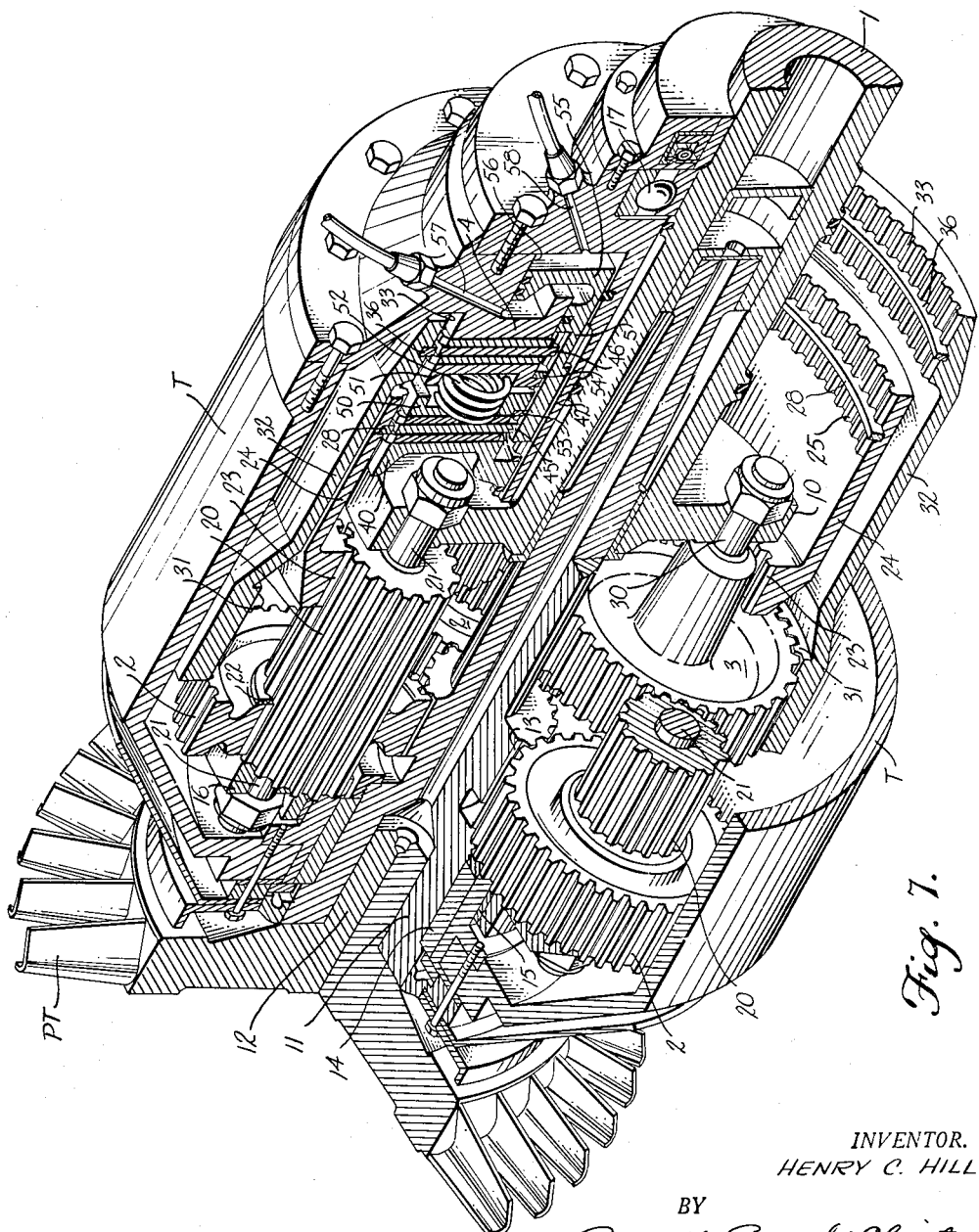
Figure 7 is a top perspective view of the transmission, showing parts broken away to reveal the internal construction.

The result of moving piston 55 to the right is shown in Figure 5, in which sleeve 5 has been shifted to the right, pressing ring 53 against control member 50. This control member exerts pressure on springs 52, pressing control member 51 against plate 34, which in turn is pressed against plate 46 and it against plate 35. As the piston continues to move, control member 50 finally will contact control member 51 directly, and the plates 34, 46 and 35 will be sandwiched into intimate relationship between control member 51 and plate 4. Since plate 4 is part of the transmission housing, plates 35 and 34 will be held stationary to lock sleeve 32, and consequently gear 31, against rotation. While plate 45 rotatively connected with sleeve 5 also cannot rotate, plates 26 and 27 will be freed for rotation.

The result of piston 55 being forced to the right as shown in Figure 5, therefore, will be that sleeve 32 and its gear 31 will be locked, whereas sleeve 24 and its gear 23 will be free to rotate. It will be noted from Figure 4 that satellite gears 3 mesh not only with ring gear 31, but also with adjacent pinions 20. If input shaft 11 is now rotated in the same direction as before to turn sun gear 13 for rotating satellite gears 2, the shafts 21 will not be moved orbitally because of the meshing of pinions 20 with gear 23, because such gear is free to turn. Rotation of the pinions will, however, drive gears 3, and these gears will roll around stationary gear 31, thus turning shafts 30 in orbital fashion. These shafts, like shafts 21, interconnect the annulus 16 and the plate 10, so that once more output shaft 1, which is integral with such plate, will be rotated.

Figure 4:
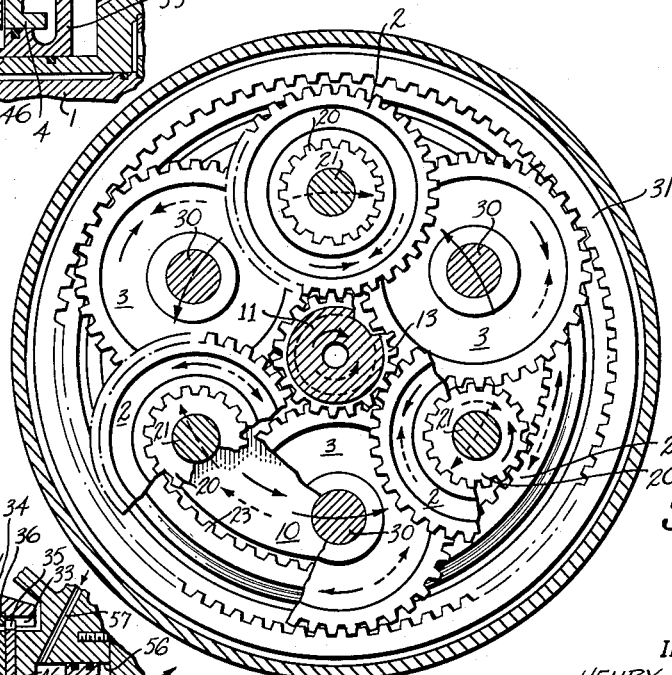
Figure 4 is a transverse sectional view taken on line 2—2 of Figure 1.

The difference over the operation previously described, however, is that, assuming clockwise rotation of sun gear 13 as seen in Figure 4 and counterclockwise rotation of gears 2 about their shafts 21 as before, the satellite gears 3 of the other set, which are driven by pinions 20, will turn about their shafts 30 in a clockwise direction, and consequently as they roll on gear 31 will now turn the shafts 30 orbitally and consequently plate 10 and output shaft 1 in a counterclockwise direction. In this instance, therefore, the output shaft 1 will be turned in the direction opposite the rotative direction of input shaft 11, so that the transmission drives in reverse instead of forward relationship.

It should be noted particularly that the reverse relationship mentioned is merely a relative situation, so that if input shaft 11 is turning clockwise, as indicated by the full line arrow in Figure 4, the disk 10 will be turning in a counterclockwise direction, as indicated by the full arrow. Conversely, if the input shaft is turning in the direction of the broken-line arrow shown in Figure 4, namely counterclockwise, the plate 10 and output shaft 1 will be turning in the direction indicated by the broken-line arrow on it, namely clockwise. This phenomenon becomes important in any particular design, because the reverse drive relationship of the input and ouput shafts may be employed to enable the output shaft to drive the input shaft in reverse, as well as vice versa. Thus, if power is being supplied by the input shaft turning clockwise, the vehicle, for example, may be backed up by thus driving the output shaft 1 in a counterclockwise direction instead of clockwise. Alternatively, if clockwise direction of rotation of disk 10 corresponds to forward movement of a vehicle, as represented by Figure 2, counterclockwise rotation of shaft 11 in Figure 4, shown by the broken arrow, corresponding to clockwise rotation of disk 10 shown by the broken arrow, will correspond to the condition of power being absorbed by the shaft 11 rather than power being supplied by it. This is the condition which obtains for dynamic braking of the vehicle.

Assuming that when power is supplied by the turbine to turn the power turbine rotor PT, such rotation occurs in a clockwise direction as indicated by the solid arrows in Figures 2 and 4, and the compressor turbine CT (Fig. 8) turns in the same direction, the vehicle would be driven forward by rotation of output shaft 1 in the clockwise direction indicated by the solid arrow on disk 10 in Figure 2. In order to drive the vehicle in reverse the input shaft 11 would still be turned in the clockwise direction as indicated by the solid arrow in Figure 4, whereas the output shaft and its disk 10 would be driven in a counterclockwise direction, as indicated by the solid arrow. If the vehicle is descending a steep grade, however, and it is desirable to utilize the turbine for braking purposes, the direction of power application indicated by the solid arrows in Figure 4 would be reversed to the condition indicated by broken arrows.

Assuming now that a vehicle equipped with the transmission described above is descending along a steep grade, and the transmission is in reverse drive position, the various gears will be turned in the directions indicated by the broken arrows in Figure 4 by the power of the vehicle descending the hill. Shaft 11, which is normally the input shaft, will therefore turn the power turbine rotor PT of the gas turbine in the direction opposite the rotative direction of the compressor driving turbine CT. Instead of the gas flowing through the engine delivering power to the turbine rotor PT, therefore, such gas will absorb power and will be discharged through the exhaust conduits E at a speed and temperature higher than would otherwise be the case, such power absorption being manifested in the form of heating gas flowing through the turbine. By reason of such power absorption a resistance to rotation of the turbine rotor PT in the direction opposite the power input direction will be produced, which will deter rotation of the output shaft 1 to afford a dynamic braking action. If it is desired to increase the braking action produced by the turbine engine, the engine will be accelerated so that more gas will oppose rotation of the turbine rotor PT and consequently of the output shaft 1. By such regulation of the engine throttle the degree of resistance to turning of shaft 1 and consequently the amount of dynamic braking effort exerted on the vehicle may be varied.

A third capability of the transmission is to exert braking effort on the vehicle to hold it stationary. As discussed previously, when the piston 55 is in its position farthest to the left as seen in Figure 3, the shafts 11 and 1 will be coupled in forward driving relationship so that rotation of the rotor PT will turn shaft 1 in the direction corresponding to forward movement of the vehicle.

Conversely, when piston 55 is in its position farthest to the right, as shown in Figure 5, the shafts 11 and 1 will be coupled in reverse driving relationship, so that rotation of the turbine rotor PT will tend to drive the vehicle backward. When the piston 55 is in an intermediate position, however, shown in Figures 1 and 9, the friction brake devices are not sufficiently positively engaged to lock the friction plates rotatively connected to sleeves 24 and 32, and consequently both of these sleeves and their corresponding ring gears 23 and 31 may rotate. Neither of these sleeves can rotate freely, however, because springs 52 will tend to spread apart control elements 50 and 51 and press them gently against both sets of friction plates. Neither will the satellite pinions 20 roll freely around gear 23, nor will the satellite gears 3 roll freely around ring gear 31, therefore, but each of these sets of satellite gears will tend to drive its ring gear. Assuming that the gearing reduction of the two trains for forward drive and reverse drive are equal, therefore, all of shafts 21 and 30 will remain stationary, thus holding disk 10 and output shaft 1 against rotation, while both ring gears 23 and 31 will be rotated, but in opposite directions, against the friction produced by their respective brakes as a result of the pressure of springs 52. Slight shifting of control lever 6 in one direction or the other from the solid line position shown in Figure 8 will create slight hydraulic pressure on one side or the other of piston 55 sufficient to shift one or the other of control members 50 and 51 for altering the pressure between the respective brake mechanisms sufficiently to result in output shaft 1 being held stationary.

The braking action on rotation of ring gears 23 and 31 effected by the friction brake devices for holding shaft 1 stationary is in contrast to the freedom with which one or the other of these gears rotates when piston 55 is moved fully to the left as in Figure 3 or fully to the right as in Figure 5. In either of these extreme positions while, as explained, one of these gears is held stationary so that the satellite gears meshing with it will roll around the ring gear. The other set of satellite gears will drive the other ring gear freely in idling fashion in the directions indicated by the arrows in Figures 2 and 4, respectively. During shifting of piston 55 from one extreme position to the other, therefore, the gears will always be similarly in mesh, but the friction brake devices will control the rotation of the ring gears, one from freely rotative condition to stopped condition, and the other from stopped condition to freely rotative condition. Thus in shifting from the position of Figure 3 to the position of Figure 5 the brake mechanism first will gradually release sleeve 24 so that the speed of gear 23 will increase progressively, whereas resistance to free rotation of sleeve 32 and hence gear 31 will gradually be produced until when the parts reach the position of Figure 5 this sleeve will be held stationary while sleeve 24 and its gear 23 will be entirely released. The opposite action occurs when the parts are shifted from the positions shown in Figure 5 to the positions of the parts shown in Figure 3. In neither instance, therefore, is there an abrupt transition between stopped and rotative conditions as occurs in meshing and unmeshing the gears. Instead the change from forward to reverse drive condition will necessarily be accomplished progressively and smoothly without jerk.

Further to prevent grabbing of the friction brake mechanisms, the seal between cylinder 56 and sleeve 5 may be loose enough to permit some leakage of oil from the cylinder to the friction plate assemblies, so that they will be lubricated to afford smooth action. The wear on these friction devices will be minimum because there is no appreciable slippage between the friction plates pressed together when the parts are in the direct driving condition of Figure 3, or in the reverse driving condition of Figure 5, and the other friction elements are freely rotatable relatively. Wear on the friction plates can only occur, therefore, when the piston 55 is in an intermediate position which, as discussed above, only occurs when shaft 1 is held stationary or nearly so while the turbine engine is in operation.

Wear is especially a negligible factor if the friction plates are of metal and oil lubricated, as mentioned above. Adequate friction can still be obtained by the use of such metallic plates by using sufficiently high oil pressure in cylinder 56 of the actuating mechanism. Also, even where metal plates are used the space provided for the friction brake devices when the piston is centered as in Figures 1 and 9 can be such as to cause the plates to produce considerable friction between them as they rotate relatively. Consequently, adequate drag can be afforded for holding the output shaft stationary, as discussed above, and when the piston 55 is being shifted from one extreme position to the other substantial friction will be produced by the plates in the transition movement, so that even though the throttle may be reasonably wide open during shift of the transmission, the turbine will not overspeed as the movement reversal is effected. The transmission may be shifted from forward drive relationship to reverse drive relationship at virtually any speed of the turbine engine and vehicle, therefore, such as from substantial driving torque condition to substantial dynamic braking torque condition without any clashing of gears.

The transmission further is relatively foolproof in that if the pump supplying oil under pressure to the transmission control mechanism should fail or a supply line for the oil should break, a dangerous condition would not occur. Upon relief of pressure in the cylinder 56 the springs 52 would expand automatically to interrupt the positive forward drive condition of Figure 3, for example. The friction brake devices would then move into the central or neutral position of Figures 1 and 9, and the friction between the plates of both brake devices would automatically tend to bring output shaft 1 to a stop. At the same time, these friction devices would also produce a drag on rotation of the power turbine rotor PT so that it would not accelerate out of control until the operator recognized the existence of trouble and reduced the supply of fuel to the turbine engine.

Under emergency conditions it may be necessary to tow a vehicle powered by a gas turbine power plant equipped with the transmission described. Under such conditions hydraulic liquid under pressure would not be available to shift piston 55 in one direction or the other, and consequently it would be centered under the action of springs 52 pressing apart the two control members 50 and 51. In this position, as explained previously, both sleeves 24 and 32 and their respective gears 23 and 31 would be rotative, but such rotation would be resisted by the action of the friction brake devices. This condition persists whether rotative effort is exerted on shaft 11 or on shaft 1, because opposite rotation of pinions 20 and satellite gears 3 will effect opposite rotation of gears 23 and 31, if neither are locked, however such rotation of the satellite gears may be effected. If such a vehicle is towed, therefore, rotation of shaft 1 will turn plate 10 for revolving shafts 21 and 30 orbitally. The resistance to rotation of sleeve 24 and gear 23 by such action will tend to cause turning of pinions 20 which seek to roll on this gear, and such rotation would drive satellite gears 3 to turn gear 31 and sleeve 32 in the opposite direction. It may be, therefore, that such rotation of shaft 1 would simply drag around both gears 23 and 31 and their sleeves 24 and 32 against the friction of the friction brake devices even though the turbine is not operating.

To obviate such a situation a rod 7 received in a recess in the transmission housing communicating with cylinder 56 is provided, as shown in Figure 1. This rod may be moved axially to the left into engagement with piston 55 by screwing in bolt 70. When movement of the rod to the left is continued after its contact with piston 55, it will mechanically shift this piston into the position shown in Figure 3, corresponding to forward driving relationship of the shafts 1 and 11. The bolt may be locked in this position by a lock nut 71.

If the vehicle is towed with piston 55 thus secured in its extreme left position, rotation of output shaft 1 will turn disk 10 in the direction indicated by the arrow in Figure 2, and pinions 20 will roll upon gear 23 which is held stationary. Satellite gears 3 and ring gear 31 will simply idle, while satellite gears 2 will drive the turbine rotor PT. Since the turbine will not be operating under these circumstances, the rotor will idle freely. With the transmission thus conditioned for towing, therefore, no appreciable resistance to rotation of shaft 1 will occur.

With mechanism of this type it will be evident that complete control of the vehicle drive can be accomplished by provision of two controls for the operator, one to vary the speed of the gas turbine engine, and the other to control the transmission, such as the lever 6 shown in Figure 8. No clutch is required as in the usual type of transmission, and it can even serve as a brake by shifting the transmission from forward drive condition to reverse drive condition, as described. It is unlikely, however, that it would be desirable to rely entirely on this type of braking action for control of an automobile, since it probably would not be desirable to effect frequent drive reversal of the transmission because of the increased wear which would occur on the friction brake devices, and because it probably would not be desirable to effect a change from forward to reverse driving relationship as rapidly as driving conditions frequently require an automobile to be stopped.

I claim as my invention:

1. Transmission mechanism comprising an output shaft, an input shaft, a drive gear carried by said input shaft, a plurality of large satellite gears larger than said drive gear, carried by said output shaft and meshing therewith, a small satellite gear smaller than, integral with and driven by each of said large satellite gears, a small controlled internal gear meshing directly with said small satellite gears, idler gears meshing directly with said small satellite gears, a large controlled internal gear larger than said small controlled internal gear and meshing with said idler gears, and control means operable to hold said small controlled gear against rotation while said large controlled gear is free to be rotated by said small satellite gears and said idler gears, to coordinate rotation of said output shaft and said input shaft in the same direction, and alternatively operable to hold said large control gear against rotation while said small control gear is rotated by said small satellite gears, to coordinate rotation of said input shaft and said output shaft in relatively opposite directions.

2. The transmission mechanism defined in claim 1, the control means being arranged annularly, and fluid piston and cylinder mechanism including an annular cylinder and a double-acting annular piston received in said cylinder operable to actuate the control means to lock the controlled gears against rotation.

3. The transmission mechanism defined in claim 2, and a control lever movable to govern the supply of fluid under pressure to the piston and cylinder mechanism to effect movement of the control means in either direction and in varying degrees.

4. The transmission mechanism defined in claim 1, a sleeve carrying the large controlled internal gear on one end, a sleeve coaxial with the first sleeve and carrying the small controlled internal gear on one end, and control means including axially aligned annuli of substantially equal diameters carried, respectively, by the other ends of said sleeves in axially spaced relationship, and separate holding means engageable with said respective annuli and operable to hold said sleeves selectively against rotation.

5. The transmission mechanism defined in claim 4, in which the two sleeves are arranged concentrically one within the other, and the outer sleeve carries its controlled gear at a location beyond one end of the inner sleeve and its annulus is disposed beyond the other end of the inner sleeve.

6. The transmission mechanism defined in claim 1, in which the gearing including the small controlled gear and the gearing including the large controlled gear are operable to effect substantially the same speed reduction between the input shaft and the output shaft when one of such gears is held by the control means as when the other of such gears is held by the control means.

7. The transmission mechanism defined in claim 1, and fluid piston and cylinder mechanism operable to actuate the control means, and means operable to maintain liquid in the cylinder at opposite sides of the piston with such liquid on one side of the piston being under pressure greater than the liquid on the other side of the piston.

8. Transmission mechanism comprising an input shaft, an output shaft, forward gearing interengaged between said input shaft and said output shaft and including a controlled gear, reverse gearing interengaged between said input shaft and said output shaft and including a controlled gear, selectively operable friction brake devices corresponding, respectively, to said forward gearing controlled gear and to said reverse gearing controlled gear and disposed adjacent to each other, means operable to effect engagement of said friction brake devices alternatively, and spring means interposed between said friction brake devices and operable to exert a resilient force simultaneously on both of said friction brake devices.

9. Transmission mechanism comprising an input shaft, an output shaft, forward gearing interengaged between said input shaft and said output shaft and including a controlled gear, reverse gearing interengaged between said input shaft and said output shaft, and including a controlled gear control means operable to hold said forward gearing controlled gear against rotation while said reverse gearing controlled gear is free to rotate, to coordinate rotation of said output shaft and said input shaft, in the same direction, and alternatively operable to hold said reverse gearing controlled gear against rotation while said forward gearing controlled gear is free to rotate, to coordinate rotation of said input shaft and said output shaft in relatively opposite directions, a control lever movable normally to actuate said control means for holding said forward gearing controlled gear or said reverse gearing controlled gear against rotation, and an emergency control operable positively to hold said forward gearing controlled gear against rotation.

10. Transmission mechanism comprising an input shaft, an output shaft, forward gearing interengaged between said input shaft and said output shaft and including a controlled gear, reverse gearing interengaged between said input shaft and said output shaft and including a controlled gear, friction brake devices corresponding, respectively, to said forward gearing controlled gear and to said reverse gearing controlled gear and both operatively connected to said output shaft, and means selectively operable to effect firm engagement of said friction brake devices alternatively and including spring means engageable simultaneously with both of said friction brake devices and operable to effect gentle engagement of both of said friction brake devices simultaneously for producing opposing torques on said output shaft.

11. Transmission mechanism comprising an input shaft, an output shaft, forward gearing interengaged between said input shaft and said output shaft and including a controlled gear, reverse gearing interengaged between said input shaft and said output shaft and including a controlled gear spaced from said first controlled gear, friction brake devices corresponding, respectively, to said forward gearing controlled gear and to said reverse gearing controlled gear and both operatively connected to said output shaft, and means selectively operable to effect firm engagement of said friction brake devices alternatively and including spring means received between said two friction brake devices and operable to effect gentle engagement of both of said friction brake devices simultaneously for producing opposing and substantially equal torques on said output shaft.

References Cited in the file of this patent

UNITED STATES PATENTS

| | | |
|---|---|---|
| 642,594 | Finlay | Feb. 6, 1900 |
| 1,395,668 | Drill | Nov. 1, 1921 |
| 1,896,440 | Durig | Feb. 7, 1933 |
| 2,170,444 | Barbarou | Aug. 22, 1939 |
| 2,293,050 | De Pew | Aug. 18, 1942 |
| 2,402,951 | De Pew | July 2, 1946 |
| 2,502,799 | Nabstedt | April 4, 1950 |
| 2,554,593 | Sedille | May 29, 1951 |
| 2,583,872 | Newcomb | June 29, 1952 |
| 2,591,540 | Grylls | Apr. 1, 1952 |

OTHER REFERENCES

Publication: Ford Field, Oct. 1950, pp. 24, 30, 38, Trade Press Pub. Co., Milwaukee, Wisconsin.